(12) United States Patent
Xie

(10) Patent No.: US 9,933,666 B2
(45) Date of Patent: Apr. 3, 2018

(54) CURVED LIQUID CRYSTAL PANEL AND CURVED LIQUID CRYSTAL DISPLAY DEVICE

(71) Applicant: Wuhan China Star Optoelectronics Technology Co., Ltd., Wuhan, Hubei (CN)

(72) Inventor: Chang Xie, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 241 days.

(21) Appl. No.: 14/906,483

(22) PCT Filed: Dec. 25, 2015

(86) PCT No.: PCT/CN2015/098990
§ 371 (c)(1),
(2) Date: Jan. 20, 2016

(87) PCT Pub. No.: WO2017/084171
PCT Pub. Date: May 26, 2017

(65) Prior Publication Data
US 2017/0235179 A1    Aug. 17, 2017

(30) Foreign Application Priority Data

Nov. 20, 2015 (CN) .......................... 2015 1 0818032

(51) Int. Cl.
G02F 1/1335    (2006.01)
G02F 1/1339    (2006.01)

(52) U.S. Cl.
CPC ...... *G02F 1/13394* (2013.01); *G02F 2201/56* (2013.01); *G02F 2202/28* (2013.01)

(58) Field of Classification Search
None
See application file for complete search history.

(56) References Cited

U.S. PATENT DOCUMENTS

2004/0135959 A1    7/2004 Choi
2005/0099577 A1    5/2005 Lee et al.
(Continued)

FOREIGN PATENT DOCUMENTS

CN    1932620 A    3/2007
CN    102768442 A    11/2012
(Continued)

*Primary Examiner* — Richard Kim
(74) *Attorney, Agent, or Firm* — Andrew C. Cheng

(57) ABSTRACT

The invention provides a curved liquid crystal panel, including a first substrate, a second substrate disposed opposite to the first substrate, frame adhesive and a plurality of holders, the space includes a central region, marginal regions and interim regions between the central region and the marginal regions, the holders are disposed in the space and between the first substrate and the second substrate, a first bearing layer is disposed on ends towards the first substrate on the holders in the central region, the first bearing layer supports the first substrate by a plane, a second bearing layer is disposed in the interim regions, the second bearing layer supports the first substrate by a supporting plane formed by a plurality of points, a third bearing layer is disposed on ends towards the first substrate on the holders in the marginal regions.

17 Claims, 1 Drawing Sheet

(56) References Cited

U.S. PATENT DOCUMENTS

2012/0086901 A1\* 4/2012 Nakagawa .......... G02F 1/13394
                                                    349/155
2017/0146842 A1\* 5/2017 Xie .................... G02F 1/13394

FOREIGN PATENT DOCUMENTS

| CN | 103955096 A | 7/2014 |
| CN | 103969891 A | 8/2014 |

\* cited by examiner

CURVED LIQUID CRYSTAL PANEL AND CURVED LIQUID CRYSTAL DISPLAY DEVICE

CROSS REFERENCE

This application claims the priority of Chinese Patent Application No. 201510818032.7, entitled "Curved Liquid Crystal Panel And Curved Liquid Crystal Display Device", filed on Nov. 20, 2015, the disclosure of which is incorporated herein by reference in its entirety.

FIELD OF THE INVENTION

The present invention relates to a liquid crystal display technology field, and more particularly to a curved liquid crystal panel and a curved liquid crystal display device.

BACKGROUND OF THE INVENTION

With the development of the liquid crystal display technology in recent years, curved liquid crystal display devices such as curved TVs are provided by most manufacturers, screens of curved liquid crystal display devices are designed to be curved, which can offer a wider view of the scene, no matter at the central or marginal part, visual effects stay the same, and distortion is reduced when watching at a short distance. Moreover, curved liquid crystal display devices can elongate the distance of the screen and the audience, in order to achieve better experience of watching. Therefore, curved liquid crystal display devices are superior in the development.

In conventional flat liquid crystal display devices, the same thickness can be obtained by holders with the same size and height that are disposed evenly between upper and bottom substrates. In a curved liquid crystal display device, when a soft liquid crystal display panel of a soft liquid crystal display device bends, stress on the center of the curved panel and that on the two sides are different, the region far from the center part of the curve is loaded with less stress. Therefore, if holders with the same size and height that are disposed evenly between upper and bottom substrate are retaining, as the center of the curve is loaded the most stress, deformation of the holders will be the most, causing the thickness of the specific part to be the least, and thickness of other area will be increasing along the direction away from the center of the curve, which can decrease the uniformity and consistency of the thickness when a liquid crystal display panel bends, leading to abnormal operation of a liquid crystal display device.

SUMMARY OF THE INVENTION

Exemplary embodiments of the invention provides a curved liquid crystal panel, which can avoid uneven distribution of thickness due to bending of a liquid crystal panel, resulting in distortion of images and abnormal colors.

The present invention further provides a curved liquid crystal display device equipped with the curved liquid crystal panel.

In order to achieve the purpose above, exemplary embodiments of the invention provide the following technical proposals:

The invention provides a curved liquid crystal panel, the curved liquid crystal panel includes a first substrate, a second substrate disposed opposite to the first substrate, frame adhesive and a plurality of holders, the frame adhesive is disposed on edges between the first substrate and the second substrate, the frame adhesive, the first substrate and the second substrate enclose to be a space where contains a liquid crystal layer, the space comprises a central region, marginal regions and interim regions between the central region and the marginal regions, the marginal regions are adjacent tightly to the frame adhesive, the holders are disposed in the space and between the first substrate and the second substrate, each end of the holders is connected to the second substrate, a first bearing layer is disposed on ends towards the first substrate on the holders in the central region, the first bearing layer supports the first substrate by a plane, a second bearing layer is disposed on ends towards the first substrate on the holders in the interim regions, the second bearing layer supports the first substrate by a supporting plane formed by a plurality of points, a third bearing layer is disposed on ends towards the first substrate on the holders in the marginal regions, the third bearing layer supports the first substrate by a supporting plane formed by a plurality of points, a bearing area of the supporting plane of the third bearing layer is smaller than that of the second bearing layer.

The first bearing layer is a bulk, a plate of a platform, a surface on the first bearing layer towards the first substrate is a plane.

The second bearing layer consists of nine bulges with same height, a surface of the each holder away from the interim regions formed by the nine bulges is the supporting plane of the second bearing layer, an arrangement of the nine bulges forming the second bearing layer on ends of holders in the marginal regions is a matrix.

The third bearing layer consists of five bulges with same height, a surface of the each holder away from the interim regions formed by the five bulges is the supporting plane of the third bearing layer, among the five bulges, four of which are distributed evenly on ends of the holders on the marginal regions, one is disposed in center of ends of the holders in the marginal regions.

A bending reference axis is disposed on the curved liquid crystal panel, a central line of the central region is disposed on the bending reference axis, the interim regions are disposed on two sides of the central region, the marginal regions are adjacent to the frame adhesive away from the two sides of the central region.

The bulges of the second bearing layer and the third bearing layer are dots, bulks or spheres.

A material of the bulges of the second bearing layer and the third bearing layer is resin or glass fiber.

The holders are arranged with same interval in the space.

The invention further provides a curved liquid crystal display device, the curved liquid crystal display device includes the curved liquid crystal panel.

The curved liquid crystal display device includes a backlight module, the backlight module and the curved liquid crystal panel are overlapped.

The curved liquid crystal panel according to the invention balances deformation of the holders in each region by connecting bearing layers disposed on holders in the central region, the interim regions and the marginal regions with the first substrate in various forms, so as to ensure the uniformity of thickness of a curved liquid crystal panel and the quality of an image.

BRIEF DESCRIPTION OF THE DRAWINGS

In order to more clearly illustrate the embodiments of the present invention or prior art, the following figures will be described in the embodiments are briefly introduced. It is obvious that the drawings are merely some embodiments of the present invention, those of ordinary skill in this field can obtain other figures according to these figures without paying the premise.

DETAILED DESCRIPTION OF PREFERRED EMBODIMENTS

Embodiments of the present invention are described in detail with reference to the accompanying drawings as follows. It is clear that the described embodiments are part of embodiments of the present invention, but not all embodiments. Based on the embodiments of the present invention, all other embodiments to those of ordinary skill in the premise of no creative efforts obtained, should be considered within the scope of protection of the present invention.

Figure 1:
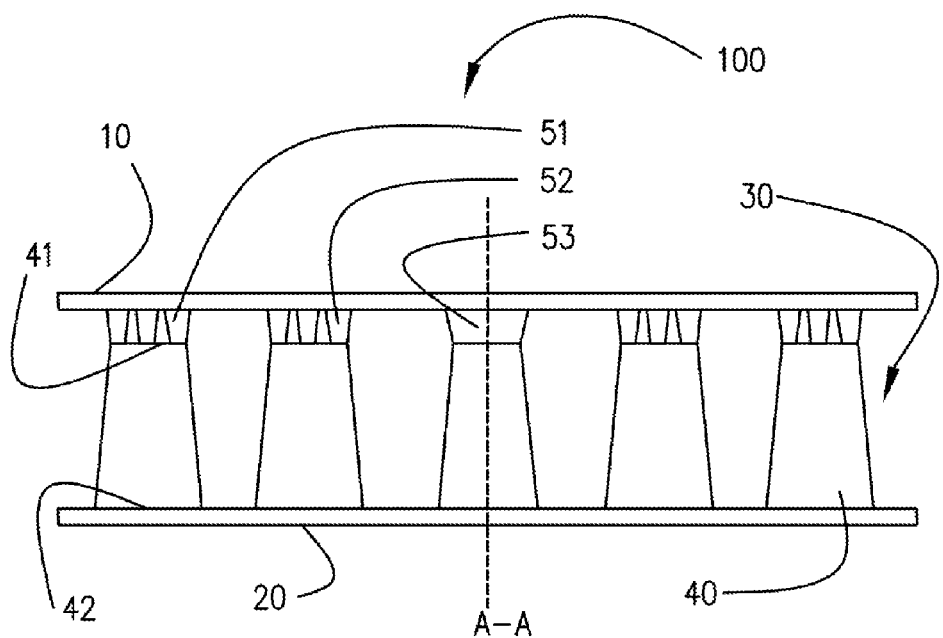
FIG. 1 is a lateral view of a curved liquid crystal panel according to a preferred embodiment of the present invention.
Figure 2:
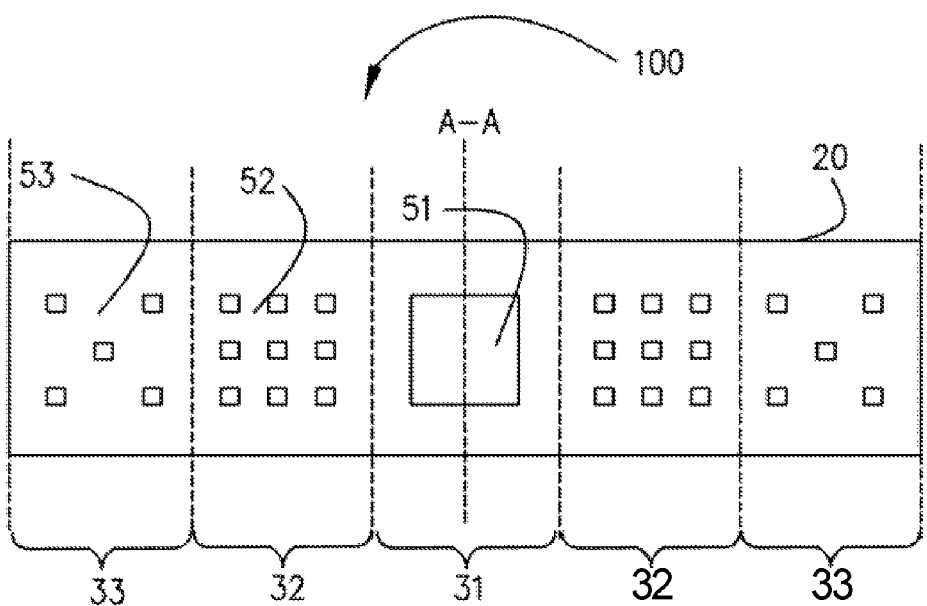
FIG. 2 is a top view of the curved liquid crystal panel of FIG. 1.

Referring to FIG. 1 and FIG. 2, a preferred embodiment of the invention provides a curved liquid crystal panel 100. The curved liquid crystal panel 100 includes a first substrate 10, a second substrate 20, a plurality of holders 40 and a frame adhesive (not shown in figures). The first substrate 10 and the second substrate 20 are glued tightly by the frame adhesive. The first substrate 10, the second substrate 20 and the frame adhesive enclose to form a space 30. The space 30 is applied to place a liquid crystal (not shown in figures). In the embodiment, the preferred first substrate 10 and the second substrate 20 are rectangle.

Furthermore, the curved liquid crystal panel 100 has a bending reference axis A-A, the first substrate 10 and the second substrate 20 are bent according to the bending reference axis A-A, which curves the liquid crystal panel 100. The space 30 is a space with a radian.

Referring to FIG. 2, moreover, the space 30 includes a central region 31, marginal regions 33 and interim regions 32 between the central region 31 and the marginal regions 33, a central line of the central region 31 is disposed on the bending reference axis A-A, the interim regions 32 are located on two sides of the central region 31, the marginal regions 33 are adjacent tightly to the frame adhesive of two sides of where away from the central region 31.

Furthermore, the holders 40 are disposed in the space 30 and between the first substrate 10 and the second substrate 20, and the holders 40 are arranged with a certain interval in the space 30. A gasket material of the holders 40 is resin or glass fiber. The holders 40 are platforms or pillars. A first end 41 and a second end opposite to the first end 41 are disposed on each holder 40. The first end 41 is opposite to the first substrate 10, the second end 42 and the second substrate 20 are towards a connection of surfaces of the space 30. A shape of the first end 41 and the second end 42 is rectangle or other shapes. In the embodiment, the preferred holders 40 are platforms, an area of the first end 41 is smaller than that of the second end 42, the first end 41 and the second end 42 are squares.

Furthermore, a first bearing layer 51 is disposed on a bulge of the first end 41 of the holders 40 in the central region 31. The first bearing layer is a bulk, a plate or a platform. The first bearing layer 51 covers the first end 41. A surface of the first bearing layer 51 towards the first substrate 10 is a plane, and the plane supports the first substrate 10. In the embodiment, the preferred first bearing layer 51 is a platform with a square upper surface and a square bottom surface. As a curvature of a curved surface of the first substrate 10 corresponding to the central region 31 end of the holders is connected to the second substrate, a first bearing layer is the largest, which means the first bearing layer 51 of the region is the most loaded, the first bearing layer 51 on the holders 40 in the central region 31 increases the stressed area by plane supporting and decreases pressure from the curve, reducing deformation of the holders 40 in the central region 31 due to the pressure.

Moreover, a second bearing layer 52 is disposed on a bulge of the first end 41 of the holders 40 in the interim regions 32. The second bearing layer 52 supports the first substrate 10 by a supporting plane formed by a plurality of points. In the embodiment, the second bearing layer 52 consists of nine bulges with same height, a surface of the each holder 40 away from the interim regions 32 formed by the nine bulges is the supporting plane of the second bearing layer 52, an arrangement of the nine bulges forming the second bearing layer 52 on the first ends 41 of the holders 40 in the interim regions 32 is a matrix. As a curvature of the first substrate 10 corresponding to the interim regions 32 is less than that corresponding to the central region 31, in other words, stress on the second bearing layer 52 is smaller, hence the second bearing layer 52 on the holders 40 in the interim regions 32 employs the supporting plane formed by a plurality of points to reduce area being loaded, and enhance pressure from the curve and deformation of the holders 40 in the interim regions 32 due to the pressure.

Furthermore, a third bearing layer 53 is disposed on bulges on the first end 41 of the holders 40 in the marginal regions 33, the third bearing layer 53 supports the first substrate 10 by a supporting plane formed by a plurality of points, a bearing area of the supporting plane of the third bearing layer 53 is smaller than that of the second bearing layer 52. In the embodiment, the third bearing layer 53 consists of five bulges with same height, a surface of the each holder away from the marginal regions 33 formed by the five bulges is the supporting plane of the third bearing layer 53, among the five bulges, four of which are distributed evenly around the first end 41 of the holders 40 in the marginal regions 33, one is disposed in center of the end 41 of the holders 40 in the marginal regions 33. As a region on curved surface of the first substrate 10 corresponding to the marginal regions 33 has the smallest curvature, which means stress on the third bearing layer 53 is the least, hence the third bearing layer 53 on the holders 40 in the marginal regions 33 employs the supporting plane formed by a plurality of points to achieve the smallest stressed area and increase pressure from the curve, which maximizes deformation of the holders 40 in the marginal regions 33 due to the pressure.

Furthermore, the first bearing layer 51, the second bearing layer 52 and the third bearing layer 53 are both made of resin or glass fiber. Bulges forming the second bearing layer 52 and the third bearing layer 53 are dots, bulks or spheres, in the embodiment, rectangular bulk bulges are preferred.

The curved liquid crystal panel 100 according to the invention balances deformation of the holders 40 in each region by connecting bearing layers disposed on holders 40 in the central region 51, the interim regions 52 and the marginal regions 53 with the first substrate 10 in various forms, so as to ensure the uniformity of thickness of a curved liquid crystal panel and the quality of an image.

The invention further provides a curved liquid crystal display device (not shown in figures), including the curved liquid crystal panel 100 and a backlight module, the backlight module and the curved liquid crystal panel 100 are overlapped.

Above are embodiments of the present invention, which does not limit the scope of the present invention. Any modifications, equivalent replacements or improvements within the spirit and principles of the embodiment described above should be covered by the protected scope of the invention.

What is claimed is:

1. A curved liquid crystal panel, wherein the curved liquid crystal panel comprises a first substrate, a second substrate disposed opposite to the first substrate, frame adhesive and a plurality of holders, the frame adhesive is disposed on edges between the first substrate and the second substrate, the frame adhesive, the first substrate and the second substrate enclose to be a space where contains a liquid crystal layer, the space comprises a central region, marginal regions and interim regions between the central region and the marginal regions, the marginal regions are adjacent tightly to the frame adhesive, the holders are disposed in the space and between the first substrate and the second substrate, each end of the holders is connected to the second substrate, a first bearing layer is disposed on ends towards the first substrate on the holders in the central region, the first bearing layer supports the first substrate by a plane, a second bearing layer is disposed on ends towards the first substrate on the holders in the interim regions, the second bearing layer supports the first substrate by a supporting plane formed by a plurality of points, a third bearing layer is disposed on ends towards the first substrate on the holders in the marginal regions, the third bearing layer supports the first substrate by a supporting plane formed by a plurality of points, a bearing area of the supporting plane of the third bearing layer is smaller than that of the second bearing layer.

2. The curved liquid crystal panel according to claim 1, wherein the first bearing layer is a bulk, a plate of a platform, a surface on the first bearing layer towards the first substrate is a plane.

3. The curved liquid crystal panel according to claim 1, wherein the second bearing layer consists of nine bulges with same height, a surface of the each holder away from the interim regions formed by the nine bulges is the supporting plane of the second bearing layer, an arrangement of the nine bulges forming the second bearing layer on ends of holders in the interim regions is a matrix.

4. The curved liquid crystal panel according to claim 3, wherein the bulges of the second bearing layer and the third bearing layer are dots, bulks or spheres.

5. The curved liquid crystal panel according to claim 4, wherein a material of the bulges of the second bearing layer and the third bearing layer is resin or glass fiber.

6. The curved liquid crystal panel according to claim 1, wherein the third bearing layer consists of five bulges with same height, a surface of the each holder away from the marginal regions formed by the five bulges is the supporting plane of the third bearing layer, among the five bulges, four of which are distributed evenly on ends of the holders on the marginal regions, one is disposed in center of ends of the holders in the marginal regions.

7. The curved liquid crystal panel according to claim 1, wherein a bending reference axis is set on the curved liquid crystal panel, a central line of the central region is disposed on the bending reference axis, the interim regions are disposed on two sides of the central region, the marginal regions are adjacent tightly to the frame adhesive away from the two sides of the central region.

8. The curved liquid crystal panel according to claim 1, wherein the holders are arranged with same interval in the space.

9. A curved liquid crystal display device, wherein in the curved liquid crystal display device, the curved liquid crystal panel comprises a first substrate, a second substrate disposed opposite to the first substrate, frame adhesive and a plurality of holders, the frame adhesive is disposed on edges between the first substrate and the second substrate, the frame adhesive, the first substrate and the second substrate enclose to be a space where contains a liquid crystal layer, the space comprises a central region, marginal regions and interim regions between the central region and the marginal regions, the marginal regions are adjacent tightly to the frame adhesive, the holders are disposed in the space and between the first substrate and the second substrate, each end of the holders is connected to the second substrate, a first bearing layer is disposed on ends towards the first substrate on the holders in the central region, the first bearing layer supports the first substrate by a plane, a second bearing layer is disposed on ends towards the first substrate on the holders in the interim regions, the second bearing layer supports the first substrate by a supporting plane formed by a plurality of points, a third bearing layer is disposed on ends towards the first substrate on the holders in the marginal regions, the third bearing layer supports the first substrate by a supporting plane formed by a plurality of points, a bearing area of the supporting plane of the third bearing layer is smaller than that of the second bearing layer.

10. The curved liquid crystal display device according to claim 9, wherein the first bearing layer is a bulk, a plate of a platform, a surface on the first bearing layer towards the first substrate is a plane.

11. The curved liquid crystal display device according to claim 9, wherein the second bearing layer consists of nine bulges with same height, a surface of the each holder away from the interim regions formed by the nine bulges is the supporting plane of the second bearing layer, an arrangement of the nine bulges forming the second bearing layer on ends of holders in the marginal regions is a matrix.

12. The curved liquid crystal display device according to claim 9, wherein the third bearing layer consists of five bulges with same height, a surface of the each holder away from the interim regions formed by the five bulges is the supporting plane of the third bearing layer, among the five bulges, four of which are distributed evenly on ends of the holders on the marginal regions, one is disposed in center of ends of the holders in the marginal regions.

13. The curved liquid crystal display device according to claim 12, wherein the bulges of the second bearing layer and the third bearing layer are dots, bulks or spheres.

14. The curved liquid crystal display device according to claim 13, wherein a material of the bulges of the second bearing layer and the third bearing layer is resin or glass fiber.

15. The curved liquid crystal display device according to claim 9, wherein a bending reference axis is set on the curved liquid crystal panel, a central line of the central region is disposed on the bending reference axis, the interim regions are disposed on two sides of the central region, the marginal regions are adjacent tightly to the frame adhesive away from the two sides of the central region.

16. The curved liquid crystal display device according to claim 9, wherein the holders are arranged with same interval in the space.

17. The curved liquid crystal display device according to claim 9, wherein the curved liquid crystal display device comprises a backlight module, the backlight module and the curved liquid crystal panel are overlapped.

* * * * *